United States Patent
Legatski et al.

(10) Patent No.: US 11,792,468 B1
(45) Date of Patent: Oct. 17, 2023

(54) SIGN LANGUAGE INTERPRETER VIEW WITHIN A COMMUNICATION SESSION

(71) Applicant: Zoom Video Communications, Inc., San Jose, CA (US)

(72) Inventors: Richard Dean Legatski, Castle Rock, CO (US); Thomas William Noble, Murfreesboro, TN (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 17/733,975

(22) Filed: Apr. 29, 2022

(51) Int. Cl.
*H04N 21/431* (2011.01)
*H04L 12/18* (2006.01)
*G09B 21/00* (2006.01)
*H04N 5/45* (2011.01)

(52) U.S. Cl.
CPC ....... *H04N 21/4316* (2013.01); *G09B 21/009* (2013.01); *H04L 12/1831* (2013.01); *H04N 5/45* (2013.01)

(58) Field of Classification Search
CPC ..... H04N 21/21805; H04N 21/234363; H04N 21/234372; H04N 21/2662; H04N 21/41415; H04N 21/4223; H04N 21/4318; H04N 21/439; H04N 21/44008; H04N 21/440236; H04N 21/4728; H04N 21/485; H04N 21/4858
See application file for complete search history.

(56) References Cited

U.S. PATENT DOCUMENTS 9,100,540 B1 * 8/2015 Gates ................. H04N 7/15
2021/0335502 A1 * 10/2021 Cordell .............. G06F 40/58

* cited by examiner

*Primary Examiner* — Samira Monshi
(74) *Attorney, Agent, or Firm* — Kilpatrick Townsend & Stockton LLP

(57) ABSTRACT

Methods and systems provide for a sign language interpreter view within a video communication session. In one embodiment, a method presents a user interface ("UI") for each of a number of client devices connected to a communication session, each UI including one or more video feeds associated with participants of the communication session. The method receives a request from a first participant to be presented with a sign language interpreter ("SLI") view within the UI; determines that a second participant is to be designated as a sign language interpreter for the communication session; and presents, within the UI of a client device associated with the first participant, an SLI view including at least a video feed of the second participant and a video feed of a highlighted speaker being interpreted by the second participant.

19 Claims, 10 Drawing Sheets

EXAMPLE OF PRIOR ART

US 11,792,468 B1

SIGN LANGUAGE INTERPRETER VIEW WITHIN A COMMUNICATION SESSION

FIELD

The present application relates generally to digital communication, and more particularly, to systems and methods for providing a sign language interpreter view within a video communication session.

SUMMARY

The appended claims may serve as a summary of this application.

BRIEF DESCRIPTION OF THE DRAWINGS

The present application relates generally to digital communication, and more particularly, to systems and methods for providing a sign language interpreter view within a video communication session.

The present disclosure will become better understood from the detailed description and the drawings, wherein.

DETAILED DESCRIPTION OF THE DRAWINGS

Figure 1A:
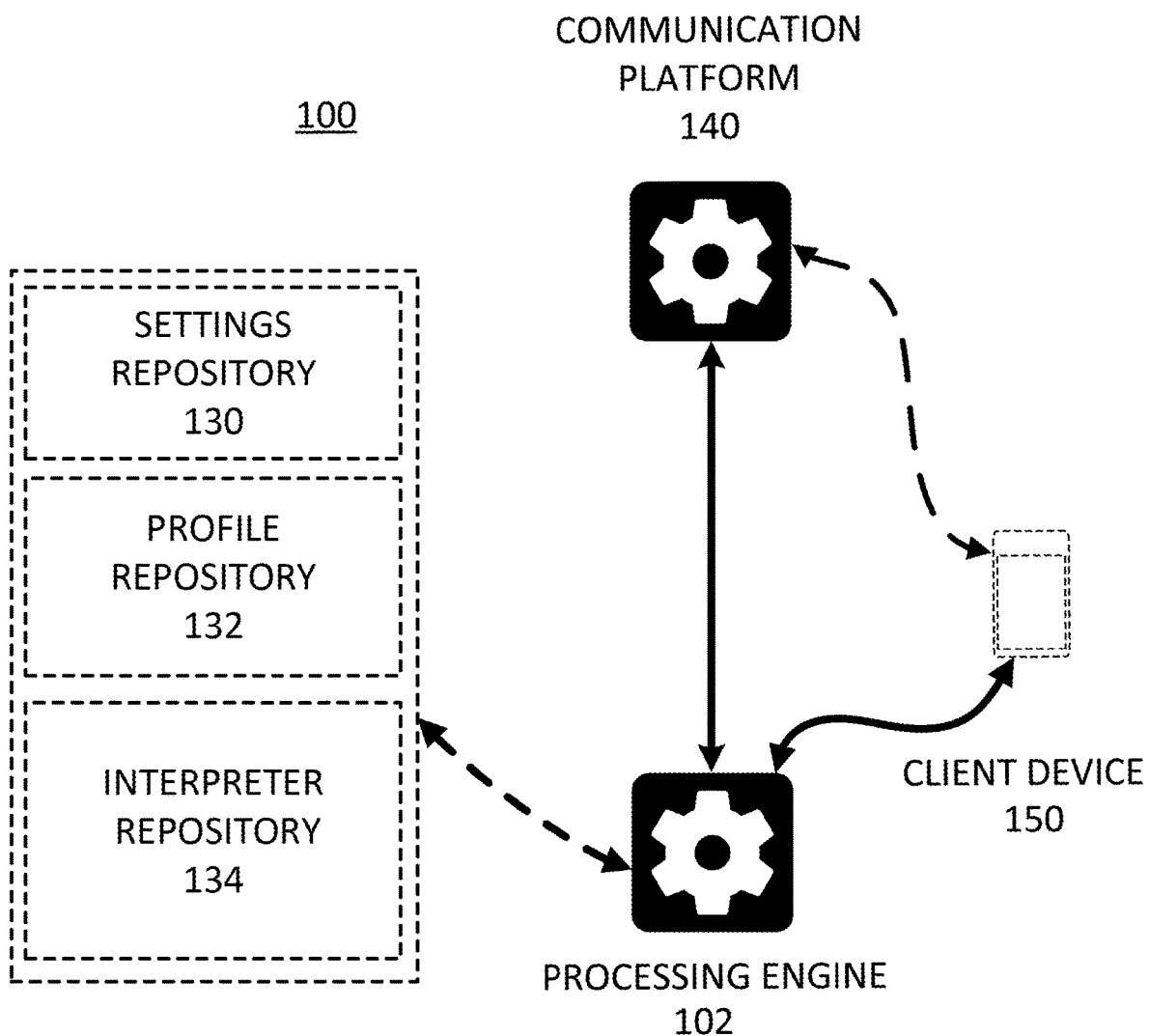
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Due to the explosive growth and global nature of remote video communication, today's global workplace presents more challenges for inclusivity than ever before. Participants of video communication sessions often have varying ways to communicate based on their abilities. One example is the use of sign languages during video communication sessions, such as, e.g., American Sign Language ("ASL") or British Sign Language ("BSL"). Some users, such as, for example, deaf or hard-of-hearing ("DHH") persons, may be unable to hear, unable to speak, or both during communication sessions. Such users may rely on sign language interpreters ("SLIs") to interpret others' speech for them. SLIs thus may provide interpretation for DHH participants. However, there are limitations in the current methods of presentation for video communication sessions with respect to enabling users of sign languages to participate in such sessions.

One key problem is that when using an SLI, the DHH participant needs to be able to see both the interpreter and the active speaker in the communication session, since the interpreter is signing on behalf of everyone speaking. With previous methods, the user has the choice between "pinning" or "spotlighting" speakers to keep them visible on screen; using an active speaker view to show the current speaker on the screen; or using a gallery view to show a multitude of participants' video feeds simultaneously. None of these solutions provide an equitable way for a DHH participant to visually follow along with the speaker while still watching the sign language interpreter. Within such previous methods, there is only a choice between prioritizing the active speaker to be visible onscreen, prioritizing the SLI to be visible onscreen, or in the case of a gallery view, to show a number of smaller-sized feeds with no larger size provided for the active speaker or SLI. Additionally, recordings or archived versions of the communication session will typically only show the active speaker, not the SLI, which makes such recordings or archived versions inaccessible to DHH viewers.

Thus, there is a need in the field of digital communication tools and platforms to create new and useful systems and methods for providing a sign language interpreter view within a video communication session. The source of the problem, as discovered by the inventors, is a lack of ability for a DHH user to enable the pinning or spotlighting of one or more SLI participants while also being presented with another participant window for an active speaker, such that the SLI participant will never go off screen and the DHH user will be able to watch who is speaking.

In one embodiment, a method presents a user interface ("UI") for each of a number of client devices connected to a communication session, each UI including one or more video feeds associated with participants of the communication session. The method receives a request from a first participant to be presented with a sign language interpreter ("SLI") view within the UI; determines that a second participant is to be designated as a sign language interpreter for the communication session; and presents, within the UI of a client device associated with the first participant, an SLI view including at least a video feed of the second participant and a video feed of a highlighted speaker being interpreted by the second participant.

Although the context described herein relates most often to an interpreter of sign language, other contexts and situations may alternatively or additionally arise. For example, a teacher or lecturer may wish to appear always visible as a highlighted video feed throughout a session, while students who are speaking are shown alongside the teacher or lecturer. The methods and systems herein provide a solution for such contexts and situations as well.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a video communication platform 140. The processing engine 102 is connected to the video communication platform 140, and optionally connected to one or more repositories and/or databases, including, e.g., a settings repository 130, profile repository 132, and/or an interpreter repository 134. One or more of the databases may be combined or split into multiple databases. The user's client device 150 in this environment may be a computer, and the video communication platform 140 and processing engine 102 may be applications or software hosted on a computer or multiple computers which are communicatively coupled via remote server or locally.

The exemplary environment 100 is illustrated with only one client device, one processing engine, and one video communication platform, though in practice there may be more or fewer additional client devices, processing engines, and/or video communication platforms. In some embodiments, the client device(s), processing engine, and/or video communication platform may be part of the same computer or device.

Figure 2:
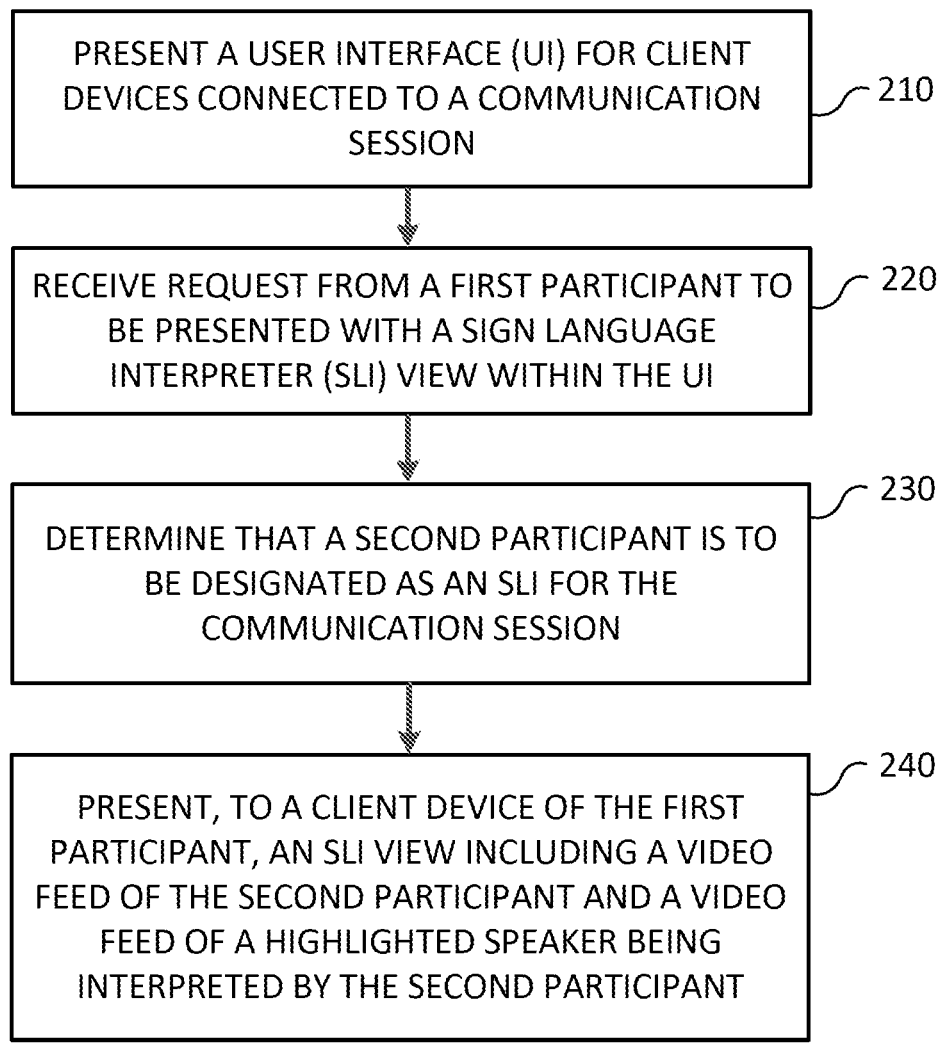
FIG. 2 is a flow chart illustrating an exemplary method that may be performed in some embodiments.

In an embodiment, the processing engine 102 may perform the exemplary method of FIG. 2 or other method herein and, as a result, provide a sign language interpret view within a video communication platform. In some embodiments, this may be accomplished via communication with the client device, processing engine, video communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or video communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the client device 150. In some embodiments, one or more of the video communication platform 140, processing engine 102, and client device 150 may be the same device. In some embodiments, the user's client device 150 is associated with a first user account within a video communication platform, and one or more additional client device(s) may be associated with additional user account(s) within the video communication platform.

In some embodiments, optional repositories can include one or more of a settings repository 130, profile repository 132, and/or interpreter repository 134. The optional repositories function to store and/or maintain, respectively, settings and/or preferences selected by participants of a video communication session; profile information related to participants; and information relating to participants designated as SLIs within the video communication session. The optional database(s) may also store and/or maintain any other suitable information for the processing engine 102 or video communication platform 140 to perform elements of the methods and systems herein. In some embodiments, the optional database(s) can be queried by one or more components of system 100 (e.g., by the processing engine 102), and specific stored data in the database(s) can be retrieved.

Video communication platform 140 is a platform configured to facilitate meetings, presentations (e.g., video presentations) and/or any other communication between two or more parties, such as within, e.g., a video conference or virtual classroom. A video communication session within the video communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
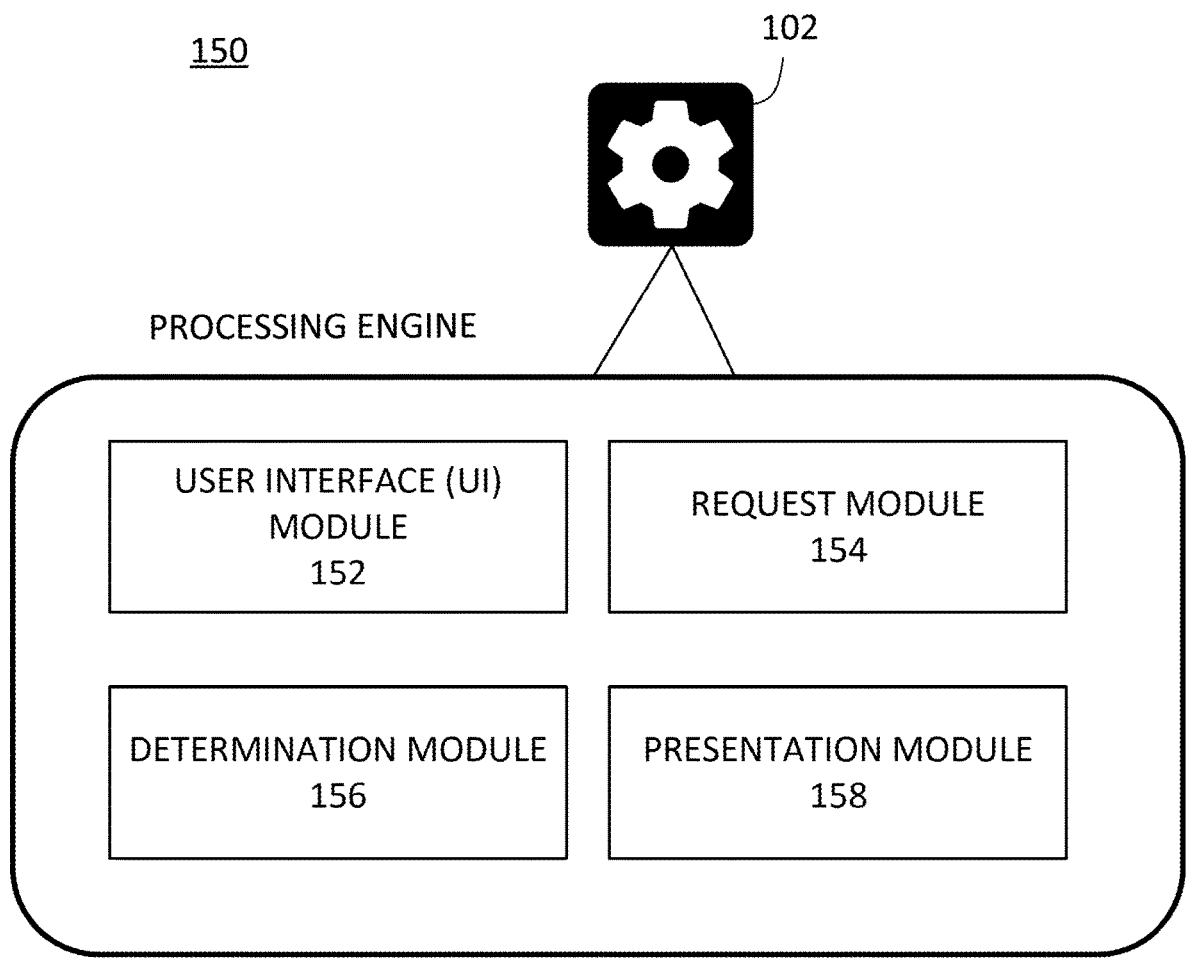
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

User interface module 152 functions to present a UI for each of a number of client devices connected to a communication session, with each UI including one or more video feeds associated with participants of the communication session.

Request module 154 functions to receive a request from a first participant to be presented with an SLI view within the UI.

Determination module 156 functions to determine that a second participant is to be designated as an SLI for the communication session.

Presentation module 158 functions to present, within the UI of a client device associated with the first participant, an SLI view including at least a video feed of the second participant and a video feed of a highlighted speaker being interpreted by the second participant.

The above modules and their functions will be described in further detail in relation to an exemplary method below.

FIG. 2 is a flow chart illustrating an exemplary method that may be performed in some embodiments.

At step 210, the system presents a UI for each of a number of client devices connected to a communication session, with each UI including one or more video feeds associated with participants of the communication session.

In some embodiments, the system connects participants to a live communication stream via their respective client devices. The communication stream may be any "session" (such as an instance of a video conference, webinar, informal chat session, or any other suitable session) initiated and hosted via the video communication platform, for remotely communicating with one or more users of the video communication platform, i.e., participants within the video communication session. Participants are connected on user devices, and are associated with user accounts within the communication platform.

The UI for the video communication session is displayed on the client device of each participant. In some embodiments, the UI appears different for different participants, or has different UI elements included for different participants depending on their user permissions, access levels (e.g., a premium-tier business user account as compared to a free-tier user account), or other aspects that may differentiate one participant from another within the video communication platform. In various embodiments, the UI is configured to allow the participant to, e.g., navigate within the video communication session, engage or interact with one or more functional elements within the video communication session, control one or more aspects of the video communication session, and/or configure one or more settings or preferences within the video communication session.

In some embodiments, the system receives a number of video feeds depicting imagery of a number of participants, the video feeds each having multiple video frames. In some embodiments, the video feeds are each generated via an external device, such as, e.g., a video camera or a smartphone with a built-in video camera, and then the video content is transmitted to the system. In some embodiments, the video content is generated within the system, such as on a participant's client device. For example, a participant may be using their smartphone to record video of themselves giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system.

In some embodiments, the video feeds are received from one or more video cameras connected to a client device associated with each participant. Thus, for example, rather than using a camera built into the client device, an external camera can be used which transmits video to the client device, or some combination of both.

In some embodiments, the participants are users of a video communication platform, and are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., sends messages back and forth between) one another in real time.

In some embodiments, the UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, sharing the participant's screen with other participants, recording the video session, and/or ending the video session.

At least a portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). In some embodiments, the participant windows are arranged in a specific way according to one or more criteria, such as, e.g., current or most recent verbal participation, host status, level of engagement, and any other suitable criteria for arranging participant windows. Some participant windows may not contain any video, for example, if a participant has disabled video or does not have a connected video camera device (e.g. a built-in camera within a computer or smartphone, or an external camera device connected to a computer).

At step 220, the system receives a request from a first participant to be presented with an SLI view within the UI. In some embodiments, a client device associated with the first participant is presented with a UI element for selecting from a multitude of UI views. The UI element may be, for example, a menu item, submenu item, or any other suitable UI element. In some embodiments, the UI views to select from include at least an SLI view (which may be listed as, for example, a "Sign Language Interpreter View" or similar). Other UI views may include, for example, an "Active Speaker View" (e.g., where the video feed of one active speaker is visible and no other video feeds are visible) or "Gallery View" (i.e., where multiple video feeds are shown simultaneously, potentially the video feeds of all participants).

In some embodiments, the system receives the request to present the SLI view to the first participant automatically upon the first participant connecting to the communication session. In some embodiments, the system receives an indication that the first participant has been pre-designated as a DHH or similar participant, through a settings or profile parameter or other similar pre-designation. The system then automatically receives the request based on this identification.

At step 230, the system determines that a second participant is to be designated as a sign language interpreter for the communication session. In some embodiments this determination is performed in response to receiving the request in step 220, while in other embodiments the determination is performed prior to or concurrently to receiving the request. In some embodiments, the second participant is pre-designated as a sign language interpreter within the platform based on one or more settings or profile parameters. For example, an administrator of an organization may designate a participant as an SLI within the platform or within one or more sessions. A host of a meeting may designate one of the participants as an SLI prior to the beginning of the session. In some embodiments, a participant may self-designate an SLI, and in some cases, some form of authorization or certification may be transmitted for platforms, sessions, organizations, or participants for which verification, certification and/or credentials may be required for an SLI participant.

In some embodiments, the determination is performed based on an indication from the first participant that the second participant is to be designated as their interpreter within the session. In some embodiments, such an indication is received via a client device associated with the first participant. In some embodiments, the client device presents a UI to the first participant, as in step 210, and the UI contains one or more UI elements allowing the first participant to designate another participant as an SLI. In some embodiments, UI elements may not appear within the UI directly, but can appear upon the participant navigating to another screen or portion of the UI, such as a settings page of profile page. In some embodiments, only a participant pre-designated as, e.g., a sign-language-using participant, DHH participant, or similar participant in need of another user to speak on their behalf may indicate such a designation of an SLI. In some embodiments, the first participant may only designate another participant who has been pre-designated as an SLI participant. In various embodiments, such pre-designations may be assigned via one or more settings parameters, profile information, or other sources of data, and may be submitted by the participant, another participant with authorization to do so, an administrator with authorization to do so, or any other suitable person or entity.

In some embodiments, receiving the indication includes determining that the first participant has selected a profile or settings parameter designating the second participant as the sign language interpreter for the first participant. For example, within a "Settings" UI element, a subpage named "Accessibility" or similar may appear. Within that subpage, a parameter may be labeled such as "Designate a sign language interpreter to speak for you". Upon the user interacting with that parameter, the user may be allowed to choose one or more participants or other users to be designated. In some embodiments, the list may be limited to users who have been pre-designated as SLIs, users who are participants of the current communication session, trusted or authorized users known by the user, or any other suitable participants or users within the communication platform.

In some embodiments, receiving the indication includes receiving a selection within the UI from the first participant indicating that the second participant is to be designated as a sign language interpreter for the first participant. For example, in some embodiments, a user may be able to right-click or otherwise interact with a video feed of another participant, and then select from a sub-menu an option for designating that participant as an SLI. Any of a number of other ways of allowing a user to designate an SLI via the UI may be contemplated.

In some embodiments, receiving the indication includes determining that the second participant has connected to the communication session via a connecting link designated for a sign language interpreter. For example, the first participant may use the UI to request a link to be generated by the system specifically for an SLI the first participant wishes to make use of. Upon the link being created, the first participant may be able to invite the second participant, or any other SLI individual of their choice, by sending them the generated link (such as by, e.g., copying the link and pasting it within a chat message to be sent to the intended SLI). Upon the SLI clicking on the link, the system may determine that the individual who clicked on the link is not the first participant and is intended to be an SLI for the first user.

In some embodiments, the system may receive a behavioral profile for the first participant which indicates, e.g., that the first participant is a DHH or similar user or that the user has designated one or more other users as SLIs in previous sessions. In varying embodiments, the behavioral profile may be an existing profile related to a particular participant and/or their user account withing the video communication platform. In some embodiments, the behavioral profile may include a number of behaviors associated with that participant with respect to the video communication platform, such as, e.g., preferences for video sessions, previous selections of options within the video communication platform, routines or habits detected by the video communication platform with respect to video sessions or use of the client device, detected metrics of user engagement for past and/or current video sessions, or any other suitable behaviors within the video communication platform. In some embodiments, the system determines one or more non-verbal forms of expression (e.g., ASL) associated with the behavioral profile for the participant. In some embodiments, this may include determining a set of non-verbal expressions from the listed behaviors from the behavioral profile.

In some embodiments, determining that the second participant is performing voicing for the first participant includes identifying that the second participant is performing sign language interpretation in response to the utterances (i.e., verbal speech) of one or more active speakers. For example, the system may be configured to identify that a participant in the session has begun to speak, and may determine based on this that the second participant is interpreting the verbal speech of this speaker for the benefit of the first participant; or may identify that the second participant is using sign language gestures, and determine based on this that the second participant will be interpreting for the first participant or generally for any participants who require interpretation; or the system may identify a combination of both.

In some embodiments, the determination that the second participant is designated to be an SLI, or is otherwise performing sign language interpretation of one or more active speakers is performed via one or more machine learning ("ML") techniques. In some embodiments, machine vision ("MV") techniques may be used to identify that the second participant is non-verbally communicating in sign language. In some embodiments, one or more ML and/or MV techniques may be used not just to identify that sign language is being used, but also to recognize the content of the sign language expression. The content may then be used to determine whether there is a match or similarity between the non-verbal expression of the second participant and the speech of the active speaker(s). In some embodiments, such ML or MV techniques may be performed in real time or substantially real time during a communication session. In some embodiments, a deep learning model may be used for detection and classification of participant movements, facial expressions, or any other suitable indication of a non-verbal cue or non-verbal communication. Such a deep learning model may be trained based on one or more datasets which include a variety of sign language communication from a multitude of different people. Datasets may additionally or alternatively include, e.g., still frames and/or video from a number of prior video communication sessions, either with one or more of the participants from this video session or with none of the participants from this video session.

In some embodiments, the system may additionally or alternatively determine that the first participant is to be designated as a DHH participant of the communication session. In some embodiments, the system makes this determination through a settings or profile parameter or other form of pre-designation indicating that the first participant is a DHH participant or similar. The system then automatically receives the request based on this identification. In some embodiments, once this determination is made, the system may proceed to step 240 if an SLI has been designated, or may proceed with a determination of an SLI who will be interpreting on behalf of the first participant.

At step 240, the system presents, within the UI of a client device associated with the first participant, an SLI view including at least a video feed of the second participant and a video feed of a highlighted speaker being interpreted by the second participant. In various embodiments, highlighting a speaker may mean, in various embodiments, showing the video feed of that speaker as the "active speaker", i.e., the visible or prominent feed shown to other participants. In some embodiments, the highlighted speaker is a currently or recently active speaker within the communication session. In some embodiments, the highlighted speaker may be highlighted in by some visual adjustment to a UI component for the video feed, such as a colored border around the feed or a resizing to make the feed appear larger than other feeds; or any other suitable way to highlight, spotlight, pin, or otherwise assign some prominence, relevance, or importance to a speaker during a session.

In some embodiments, presenting the view within the UI includes presenting the video feed of the second participant and the video feed of the highlighted speaker side by side in an adjacent fashion. An example and further detail can be found herein with respect to FIG. 4A.

In some embodiments, presenting the view within the UI includes presenting the video feed of the second participant as a smaller picture-in-picture within the video feed of the highlighted speaker. An example and further detail can be found herein with respect to FIG. 4B.

In some embodiments, the system receives a request from an authorized participant to record the communication session, then generates a recorded video of the communication session with the UI displayed within the recorded video including the presented SLI view. This allows an individual in need of sign language interpretation for a session to have a recording or archived version of the session with the SLI interpreting throughout. In some embodiments, other individuals who do not require interpretation may view a different generated recording where the SLI is not visible. In some embodiments, the authorized participant may be the first participant, who is in need of interpretation in the recording. The authorized participant may instead by a host, administrator, or any other participant with authorization. Authorization may alternatively or additionally be provided, in various embodiments, by a pre-designation of a participant as a DHH or similar participant, an SLI, a host of the meeting, or any other suitable authorization or pre-designation.

In some embodiments, the system receives an indication that the presented SLI view should be presented in the recording, and in response the system generates the recorded video with the SLI view being presented in the video. For example, there may be a UI component within the UI allowing an authorized participant to have a recording generated with the SLI view presented. In some embodiments, the UI component may also include the ability to spotlight or highlight one or more individuals, such as an SLI, to be present within the view. In some embodiments, there may be an option or parameter to enable the capture of active speaker(s), a screen share such as a presentation or sharing of a desktop or window, and the SLI simultaneously in one UI view presented in the recording.

In some embodiments, the UIs of at least a subset of the client devices associated with participants other than the first participant and the second participant do not present the video feed of the second participant. That is, while one or more DHH or similar participants may have an SLI view which presents the SLI alongside one or more other video feeds, non-DHH participants which are not in need of seeing the SLI can view the communication session via a different view within the UI, such as, e.g., an Active Speaker View or Gallery View.

In some embodiments, the video feed of the highlighted speaker is replaced by a video feed of a second highlighted speaker while the video feed of the second participant remains present. This may occur, for example, when an active speaker switches from one person to another. In such a situation, the SLI can remain presented without change, while the previously active speaker which is highlighted can be replaced with a different active speaker. This will enable, for example, an SLI to continue to be visible while they are interpreting for the new active speaker without any interruption or discontinuity, and with the participant viewing the SLI view to be able to see both the SLI and the new active speaker.

Figure 3A:
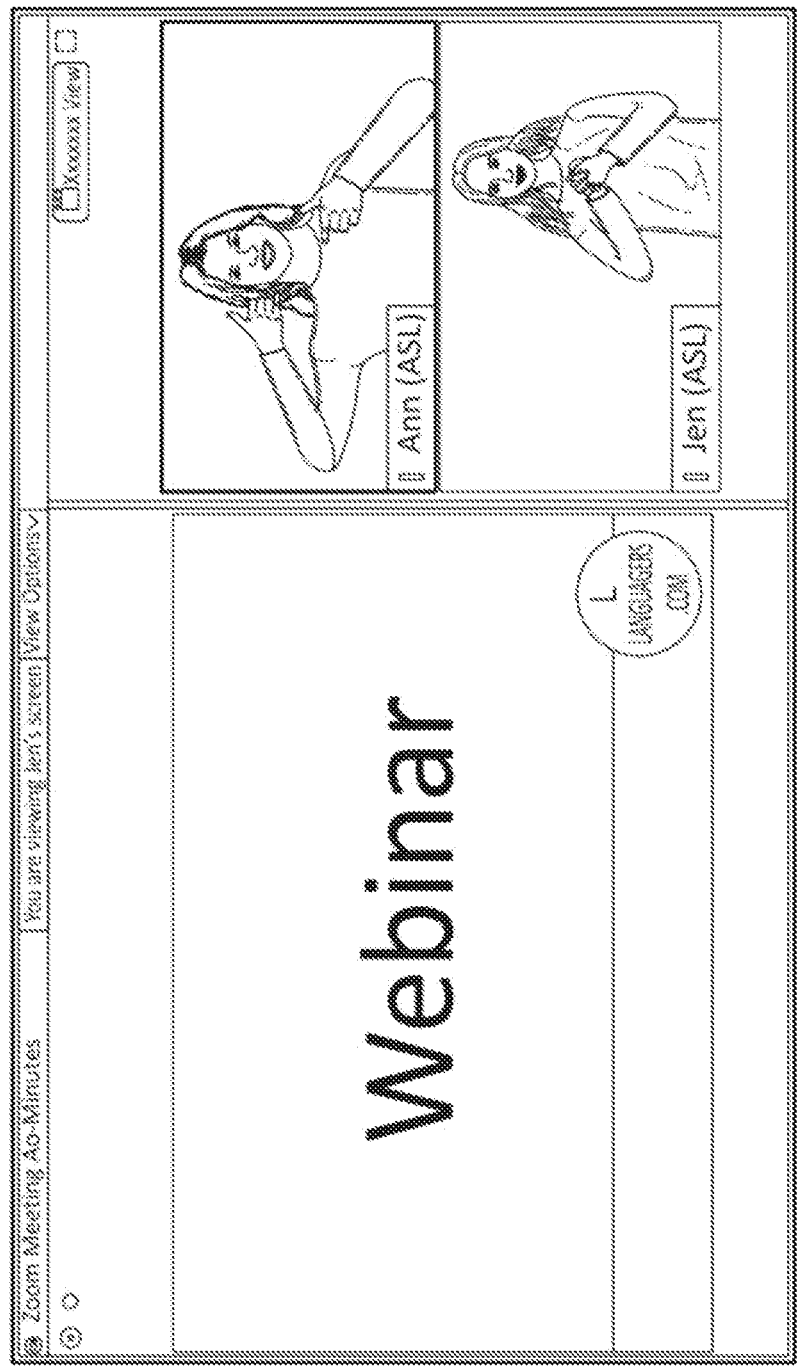
FIG. 3A is a diagram illustrating an example of a prior art method for presenting sign language interpreters.

FIG. 3A is a diagram illustrating one example of a prior art method for presenting sign language interpreters.

Within this prior art example, a UI is presented for a video communication session. The UI shows three separate UI components. On the left, a presentation with a number of slides is presented. On the right, two video feeds are presented, each showing an SLI providing interpretation for a different speaking individual. As can be seen from this example, the only visible participants shown are the two SLI participants. The active speakers themselves are not visible on the screen, which prevents added understanding from a DHH participant who would gain benefit from seeing the active speaker's facial expressions, read their lips, or otherwise gain some insight into what is being said and/or how it is being said. Thus, this prior art example illustrates an undesirable situation.

Figure 3B:
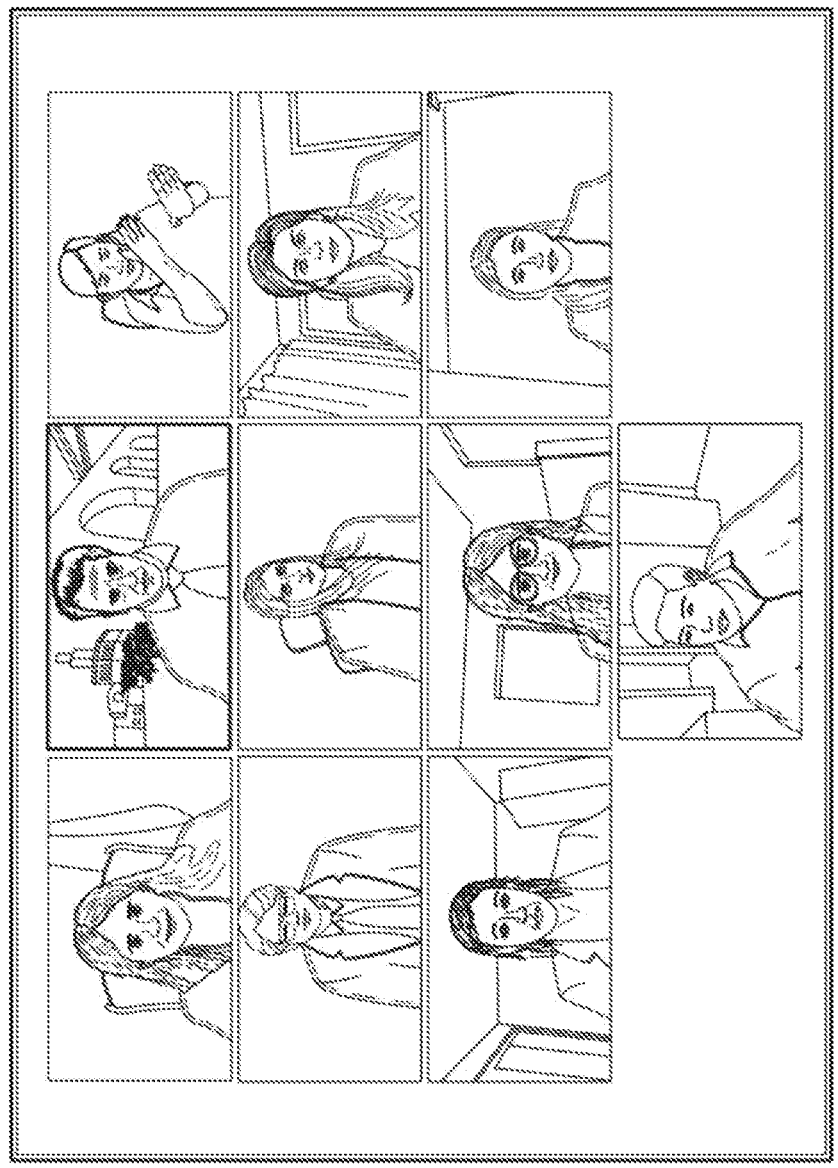
FIG. 3B is a diagram illustrating an example of a prior art method for presenting sign language interpreters.

FIG. 3B is a diagram illustrating an example of a prior art method for presenting sign language interpreters.

Within this prior art example, a "gallery view" is shown wherein the video feeds of all participants within the session are shown. The active speaker is highlighted with a special border in the top center, while an SLI in the top right is interpreting what the active speaker is saying. However, neither the active speaker video feed nor the SLI video feed are resized to provide a better view to a participant in need of the SLI. Such a gallery view may still be the view that a DHH or similar participant chooses over an SLI view, based on their preferences, but the option of an SLI view would potentially greatly improve visibility of both video feeds. Thus, presenting such a gallery view without an option for an SLI view is an undesirable situation.

Figure 3C:
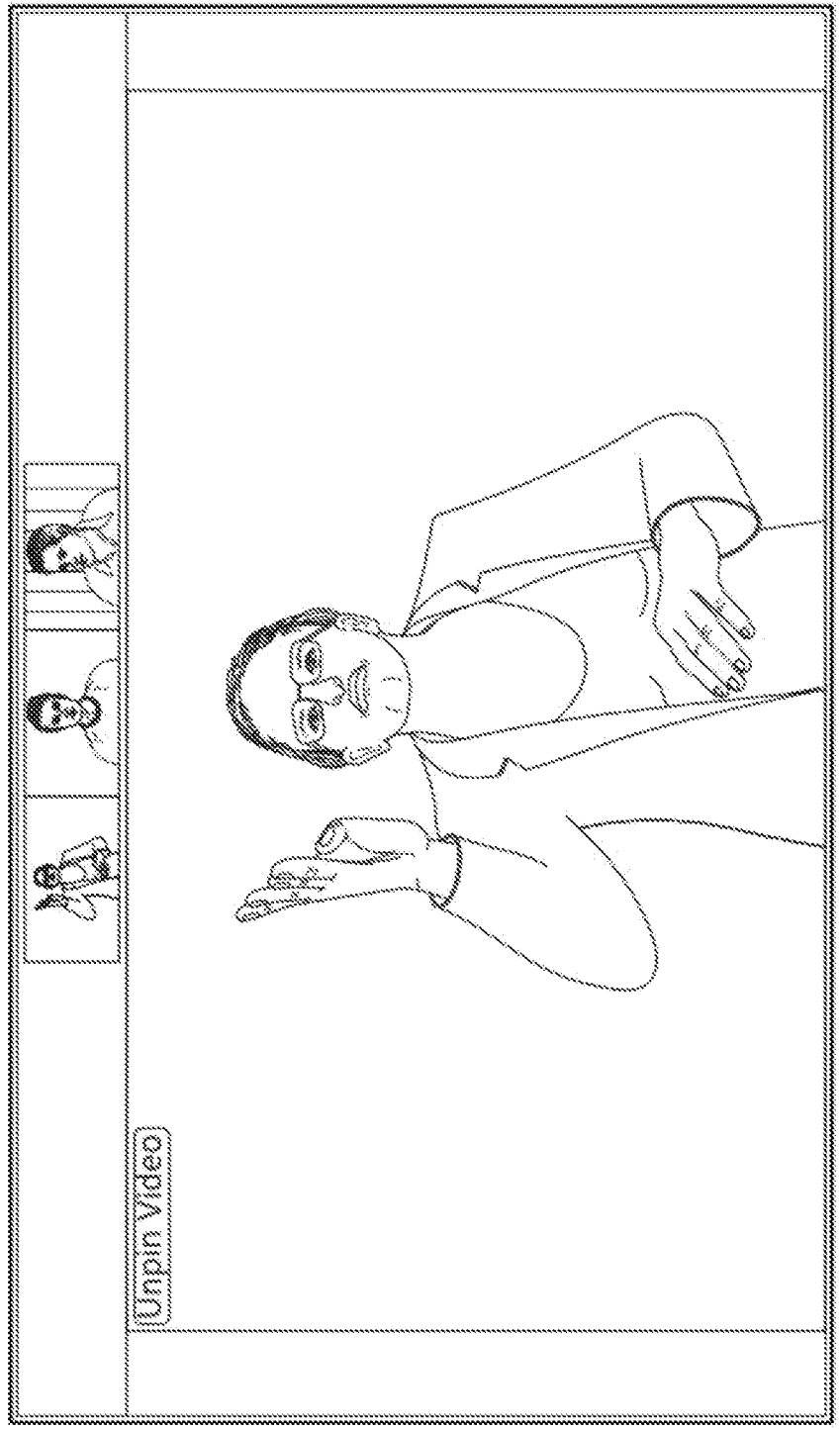
FIG. 3C is a diagram illustrating an example of a prior art method for presenting sign language interpreters.

FIG. 3C is a diagram illustrating an example of a prior art method for presenting sign language interpreters. In this prior art example, an SLI is visible as a prominently displayed active video feed. A DHH or similar participant may have "pinned" or otherwise selected the SLI to be always shown as an active video feed in a prominent position. However, the participant is not able to select an active speaker to be also shown alongside or side-by-side with the SLI, with the active speaker changing in real time while the SLI remains, interpreting the speech of the new speaker. In some embodiments, the SLI may be able to pin two individuals, but they would always be pinned in a prominent location within the UI. Thus, when an active speaker stops talking and no longer is speaking, they may still be pinned within the UI until the DHH participant deselects and "unpins" them. Thus, in this example there is no dynamic solution for an SLI and a changing active speaker to be presented with equal or similar prominence.

Figure 4A:
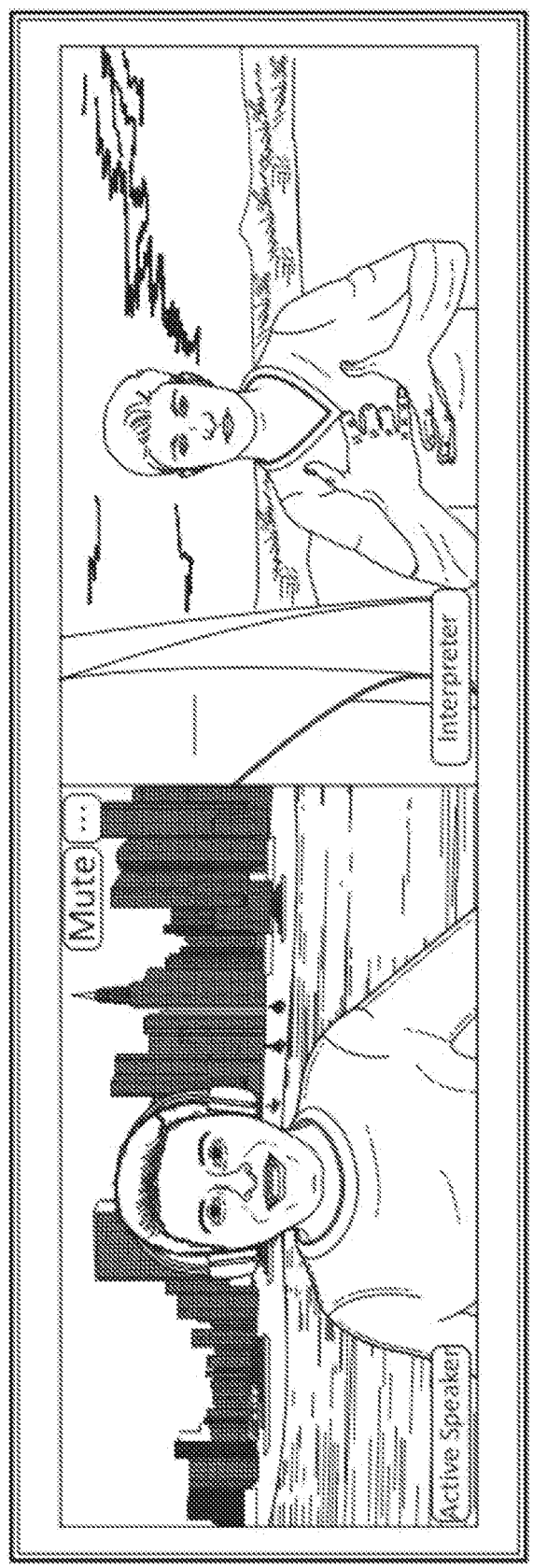
FIG. 4A is a diagram illustrating one example embodiment of presenting a side-by-side sign language interpreter view, according to some embodiments.

FIG. 4A is a diagram illustrating one example embodiment of presenting a side-by-side sign language interpreter view, according to some embodiments.

In the illustrated example, a UI is presented which shows two video feeds side-by-side. On the left is an active speaker who is currently speaking. On the right is an SLI participant who is interpreting the speech of the active speaker on the left. The illustrated example is an example of an SLI view which is desirable for DHH or similar participants. The SLI on the right will always be present as an interpreter within the session. The video feed on the left will show the active speaker. In some embodiments, if this active speaker remains as the only active speaker during the session, then the video feed will not change. However, if a new active speaker is speaking and this speaker has stopped talking, then the video feed shown on the left will be replaced with the new active speaker.

Figure 4B:
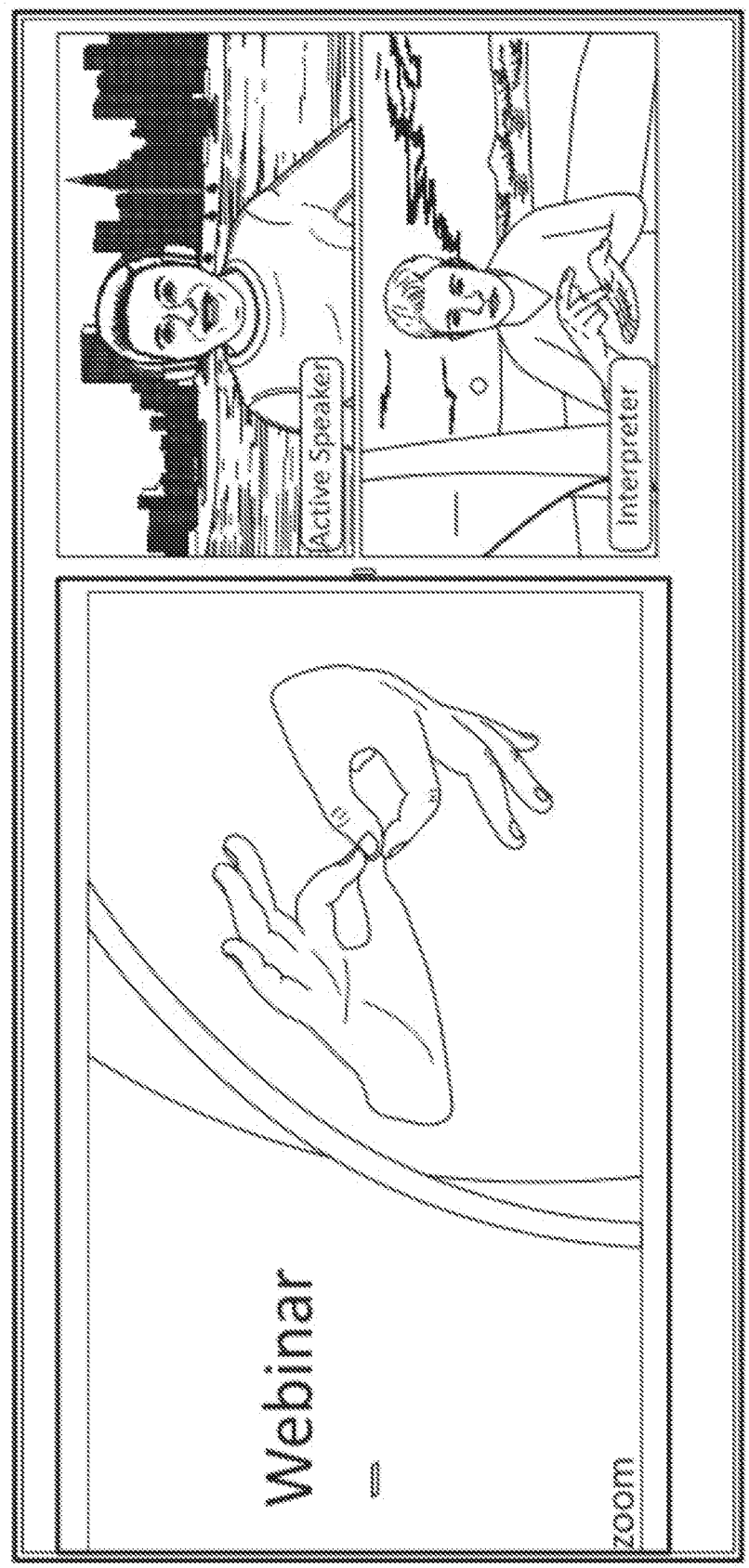
FIG. 4B is a diagram illustrating one example embodiment of presenting a sign language interpreter view with presentation content, according to some embodiments.

FIG. 4B is a diagram illustrating one example embodiment of presenting a sign language interpreter view with presentation content, according to some embodiments.

The illustrated example is an SLI view similar to FIG. 4A, but with an added content share feed being added to the view. In this example, the content share is a webinar with a number of slides being presented over time. The webinar content is shown on the left in a prominent size suitable for reading text. The active speaker is shown in the top right, and the SLI is shown in the bottom right. The SLI feed will always be present. In some embodiments, however, the size and/or position of the SLI and active speaker feeds may be adjusted, such as, for example, if the content share has finished and the presentation of the slides has terminated.

Figure 4C:
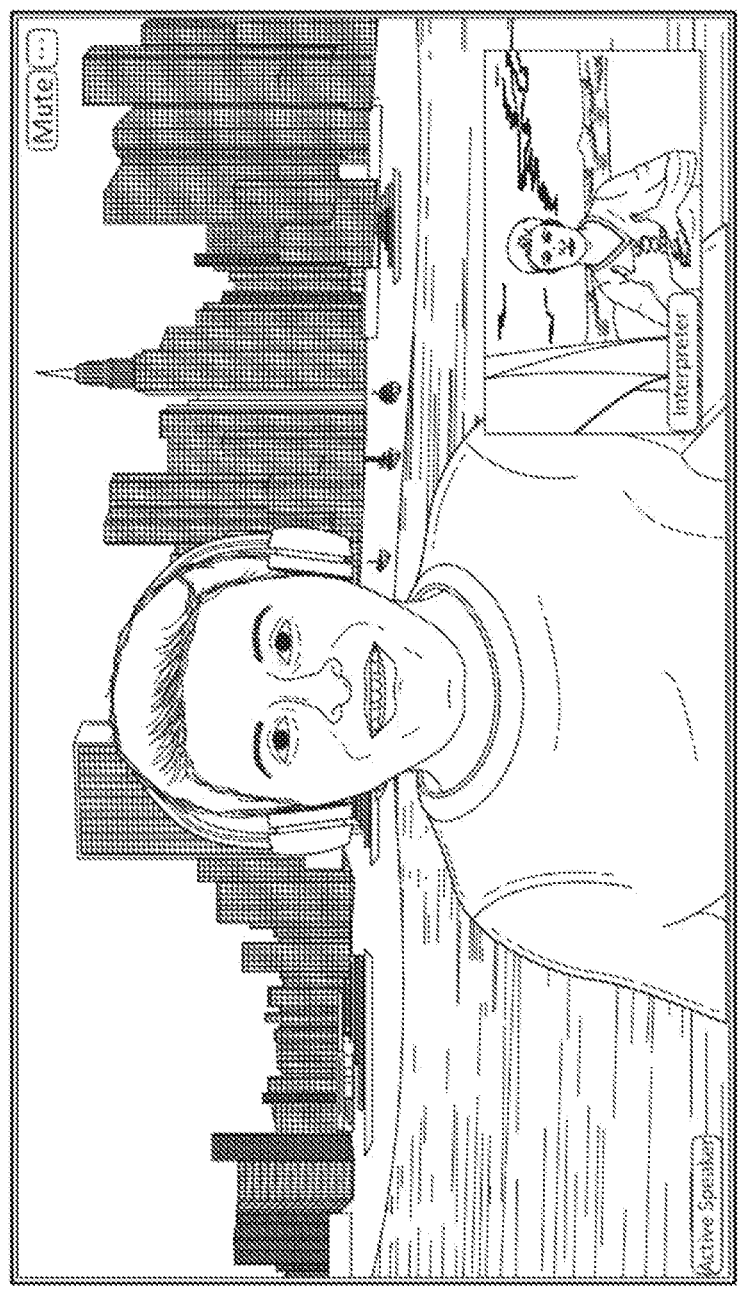
FIG. 4C is a diagram illustrating one example embodiment of presenting a picture-in-picture sign language interpreter view, according to some embodiments.

FIG. 4C is a diagram illustrating one example embodiment of presenting a picture-in-picture sign language interpreter view, according to some embodiments.

In the illustrated example, an SLI view is presented in "picture-in-picture" fashion, such as might often be seen in news broadcasts. An active speaker video feed takes up the full UI or a major portion of the UI. In some embodiments, this may instead be a content share feed. An SLI video feed is then inset within a smaller subregion of the area allocated to the active speaker video feed or content share feed. With prior art examples, the only option would be to have an SLI feed be the same size as all other feeds. Often, however, a DHH or similar participant would like an interpreter to be inset into a main feed so that they can see them, but they can also follow any presentation in full screen or clearly see active speakers. Such a picture-in-picture SLI view thus caters to such preferences.

Figure 5:
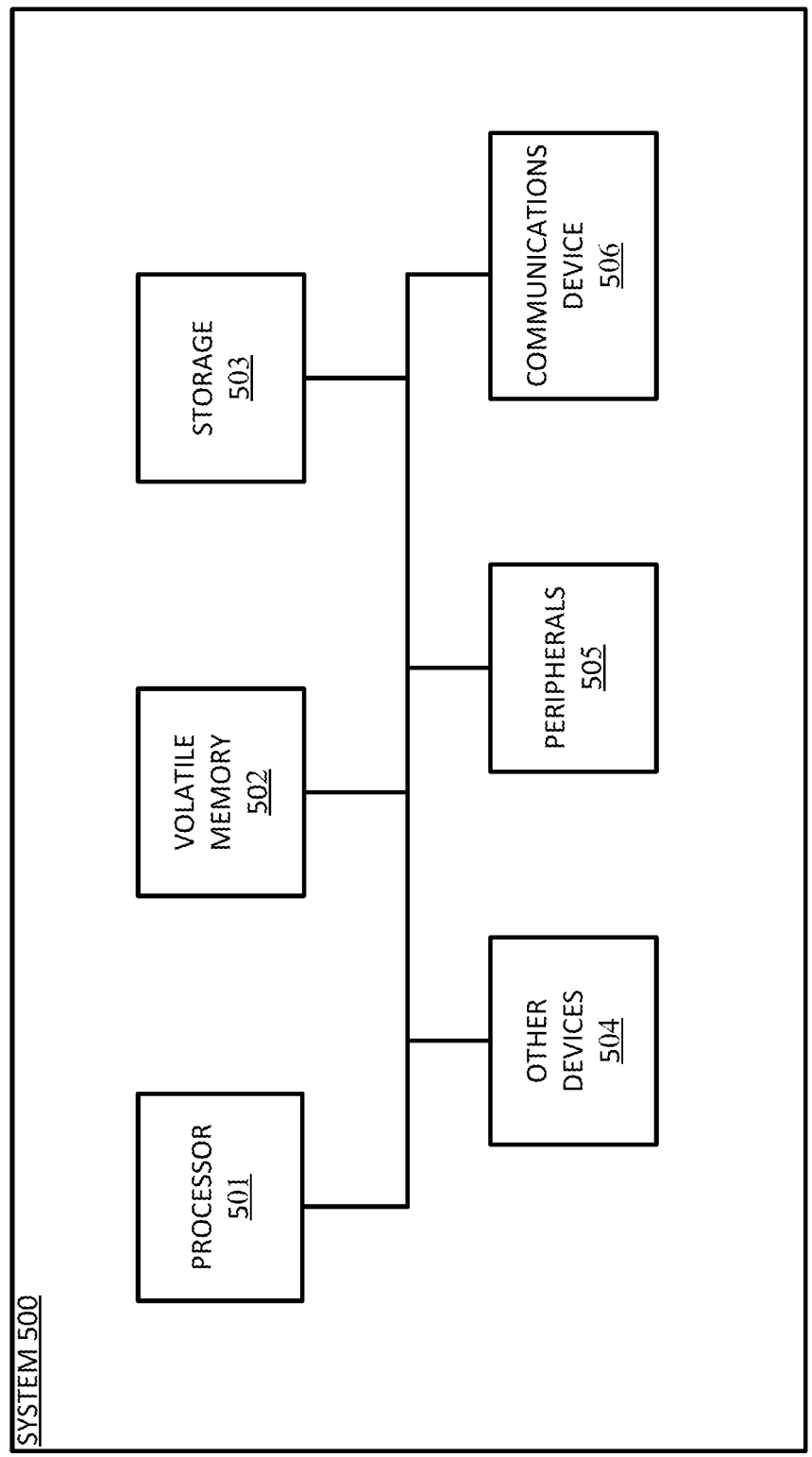
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

It will be appreciated that the present disclosure may include any one and up to all of the following examples.

Example 1. A method comprising: presenting a user interface (UI) for each of a plurality of client devices connected to a communication session, each UI comprising one or more video feeds associated with participants of the communication session; receiving a request from a first participant to be presented with a sign language interpreter (SLI) view within the UI; determining that a second participant is to be designated as a sign language interpreter for the communication session; and presenting, within the UI of a client device associated with the first participant, an SLI view comprising at least a video feed of the second participant and a video feed of a highlighted speaker being interpreted by the second participant.

Example 2. The method of example 1, wherein presenting the view within the UI comprises presenting the video feed of the second participant and the video feed of the highlighted speaker side by side in an adjacent fashion.

Example 3. The method of any of examples 1-2, wherein presenting the view within the UI comprises presenting the video feed of the second participant as a smaller picture-in-picture within the video feed of the highlighted speaker.

Example 4. The method of any of examples 1-3, further comprising: receiving a request from an authorized participant to record the communication session; and generating a recorded video of the communication session with the UI displayed within the recorded video comprising the presented SLI view.

Example 5. The method of example 4, wherein the UI of the recorded video comprises the presented SLI view in response to receiving an indication that the presented SLI view should be presented in the recording.

Example 6. The method of any of examples 1-5, wherein the UIs of at least a subset of the client devices associated with participants other than the first participant and the second participant do not present the video feed of the second participant.

Example 7. The method of any of examples 1-6, wherein determining that the second participant is to be designated as a sign language interpreter for the communication session comprises identifying a profile or settings parameter designating the second participant as a sign language interpreter.

Example 8. The method of any of examples 1-7, wherein determining that the second participant is to be designated as a sign language interpreter for the communication session comprises receiving a selection within the UI from the first participant indicating that the second participant is to be designated as a sign language interpreter for the first participant.

Example 9. The method of any of examples 1-8, wherein determining that the second participant is to be designated as a sign language interpreter for the communication session comprises determining that the second participant has connected to the communication session via a connecting link designated for a sign language interpreter.

Example 10. The method of any of examples 1-9, further comprising: prior to receiving the request from the first participant, presenting, within the UI of the client device associated with the first participant, a UI element for selecting from a plurality of UI views, wherein the plurality of UI views to select from comprises at least the SLI view.

Example 11. The method of any of examples 1-10, wherein determining that the second participant is to be designated as a sign language interpreter comprises identifying that the second participant is performing sign language interpretation in response to the utterances of one or more active speakers.

Example 12. The method of any of examples 1-11, wherein determining that the second participant is to be designated as a sign language interpreter is performed via one or more machine learning techniques.

Example 13. The method of any of examples 1-12, further comprising: determining that the first participant is to be designated as a deaf or hard-of-hearing (DHH) participant of the communication session.

Example 14. The method of any of examples 1-13, wherein the highlighted speaker is a currently or recently active speaker within the communication session.

Example 15. The method of example 14, wherein the video feed of the highlighted speaker is replaced by a video feed of a second highlighted speaker while the video feed of the second participant remains present.

Example 17. The method of any of examples 1-16, wherein presenting the view within the UI comprises presenting the video feed of the second participant and the video feed of the highlighted speaker side by side in an adjacent fashion.

Example 18. The method of any of examples 1-17, wherein presenting the view within the UI comprises presenting the video feed of the second participant as a smaller picture-in-picture within the video feed of the highlighted speaker.

Example 19. The method of any of examples 1-18, the one or more processors being configured to further perform the operations of: receiving a request from an authorized participant to record the communication session; and generating a recorded video of the communication session with the UI displayed within the recorded video comprising the presented SLI view Example 20. A communication system comprising one or more processors configured to perform the operations of: presenting a user interface (UI) for each of a plurality of client devices connected to a communication session, each UI comprising one or more video feeds associated with participants of the communication session; receiving a request from a first participant to be presented with a sign language interpreter (SLI) view within the UI; determining that a second participant is to be designated as a sign language interpreter for the communication session; and presenting, within the UI of a client device associated with the first participant, an SLI view comprising at least a video feed of the second participant and a video feed of a highlighted speaker being interpreted by the second participant.

Example 21. The communication system of example 20, wherein presenting the view within the UI comprises presenting the video feed of the second participant and the video feed of the highlighted speaker side by side in an adjacent fashion.

Example 22. The communication system of any of examples 20-21, wherein presenting the view within the UI comprises presenting the video feed of the second participant as a smaller picture-in-picture within the video feed of the highlighted speaker.

Example 23. The communication system of any of examples 20-22, wherein the one or more processors are further configured to perform the operations of: receiving a request from an authorized participant to record the communication session; and generating a recorded video of the communication session with the UI displayed within the recorded video comprising the presented SLI view.

Example 24. The communication system of example 23, wherein the UI of the recorded video comprises the presented SLI view in response to receiving an indication that the presented SLI view should be presented in the recording.

Example 25. The communication system of any of examples 20-24, wherein the UIs of at least a subset of the client devices associated with participants other than the first participant and the second participant do not present the video feed of the second participant.

Example 26. The communication system of any of examples 20-25, wherein determining that the second participant is to be designated as a sign language interpreter for the communication session comprises identifying a profile or settings parameter designating the second participant as a sign language interpreter.

Example 27. The communication system of any of examples 20-26, wherein determining that the second participant is to be designated as a sign language interpreter for the communication session comprises receiving a selection within the UI from the first participant indicating that the second participant is to be designated as a sign language interpreter for the first participant.

Example 28. The communication system of any of examples 20-27, wherein determining that the second participant is to be designated as a sign language interpreter for the communication session comprises determining that the second participant has connected to the communication session via a connecting link designated for a sign language interpreter.

Example 29. The communication system of any of examples 20-28, wherein the one or more processors are further configured to perform the operation of: prior to receiving the request from the first participant, presenting, within the UI of the client device associated with the first participant, a UI element for selecting from a plurality of UI views, wherein the plurality of UI views to select from comprises at least the SLI view.

Example 30. The communication system of any of examples 20-29, wherein determining that the second participant is to be designated as a sign language interpreter comprises identifying that the second participant is performing sign language interpretation in response to the utterances of one or more active speakers.

Example 31. The communication system of any of examples 20-30, wherein determining that the second participant is to be designated as a sign language interpreter is performed via one or more machine learning techniques.

Example 32. The communication system of any of examples 20-31, wherein the one or more processors are further configured to perform the operation of: determining that the first participant is to be designated as a deaf or hard-of-hearing (DHH) participant of the communication session.

Example 33. The communication system of any of examples 20-32, wherein the highlighted speaker is a currently or recently active speaker within the communication session.

Example 34. The communication system of example 33, wherein the video feed of the highlighted speaker is replaced by a video feed of a second highlighted speaker while the video feed of the second participant remains present.

Example 35. A non-transitory computer-readable medium containing instructions for generating a note with session content from a communication session, comprising: instructions for presenting a user interface (UI) for each of a plurality of client devices connected to a communication session, each UI comprising one or more video feeds associated with participants of the communication session; instructions for receiving a request from a first participant to be presented with a sign language interpreter (SLI) view within the UI; instructions for determining that a second participant is to be designated as a sign language interpreter for the communication session; and instructions for presenting, within the UI of a client device associated with the first participant, an SLI view comprising at least a video feed of the second participant and a video feed of a highlighted speaker being interpreted by the second participant.

Example 36. The non-transitory computer-readable medium of example 35, wherein presenting the view within the UI comprises presenting the video feed of the second participant and the video feed of the highlighted speaker side by side in an adjacent fashion.

Example 37. The non-transitory computer-readable medium of any of examples 35-36, wherein presenting the view within the UI comprises presenting the video feed of the second participant as a smaller picture-in-picture within the video feed of the highlighted speaker.

Example 38. The non-transitory computer-readable medium of any of examples 35-37, further comprising: instructions for receiving a request from an authorized participant to record the communication session; and generating a recorded video of the communication session with the UI displayed within the recorded video comprising the presented SLI view.

Example 39. The non-transitory computer-readable medium of example 38, wherein the UI of the recorded video comprises the presented SLI view in response to receiving an indication that the presented SLI view should be presented in the recording.

Example 40. The non-transitory computer-readable medium of any of examples 35-39, wherein the UIs of at least a subset of the client devices associated with participants other than the first participant and the second participant do not present the video feed of the second participant.

Example 41. The non-transitory computer-readable medium of any of examples 35-40, wherein determining that the second participant is to be designated as a sign language interpreter for the communication session comprises identifying a profile or settings parameter designating the second participant as a sign language interpreter.

Example 42. The non-transitory computer-readable medium of any of examples 35-41, wherein determining that the second participant is to be designated as a sign language interpreter for the communication session comprises receiving a selection within the UI from the first participant indicating that the second participant is to be designated as a sign language interpreter for the first participant.

Example 43. The non-transitory computer-readable medium of any of examples 35-42, wherein determining that the second participant is to be designated as a sign language interpreter for the communication session comprises determining that the second participant has connected to the communication session via a connecting link designated for a sign language interpreter.

Example 44. The non-transitory computer-readable medium of any of examples 35-43, further comprising: prior to receiving the request from the first participant, presenting, within the UI of the client device associated with the first participant, a UI element for selecting from a plurality of UI views, wherein the plurality of UI views to select from comprises at least the SLI view.

Example 45. The non-transitory computer-readable medium of any of examples 35-44, wherein determining that the second participant is to be designated as a sign language interpreter comprises identifying that the second participant is performing sign language interpretation in response to the utterances of one or more active speakers.

Example 46. The non-transitory computer-readable medium of any of examples 35-45, wherein determining that the second participant is to be designated as a sign language interpreter is performed via one or more machine learning techniques.

Example 47. The non-transitory computer-readable medium of any of examples 35-46, further comprising: instructions for determining that the first participant is to be designated as a deaf or hard-of-hearing (DHH) participant of the communication session.

Example 48. The non-transitory computer-readable medium of any of examples 35-47, wherein the highlighted speaker is a currently or recently active speaker within the communication session.

Example 49. The non-transitory computer-readable medium of example 48, wherein the video feed of the highlighted speaker is replaced by a video feed of a second highlighted speaker while the video feed of the second participant remains present.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage,to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   presenting a user interface (UI) for each of a plurality of client devices connected to a communication session, each UI comprising one or more video feeds associated with participants of the communication session;
   determining that a first participant is to be designated as a deaf or hard-of-hearing (DHH) participant of the communication session;
   receiving a request from the first participant to be presented with a sign language interpreter (SLI) view within the UI;
   determining that a second participant is to be designated as a sign language interpreter for the communication session; and
   presenting, within the UI of a client device associated with the first participant, an SLI view comprising at least a video feed of the second participant and a video feed of a highlighted speaker being interpreted by the second participant.

2. The method of claim 1, wherein presenting the SLI view within the UI comprises presenting the video feed of the second participant and the video feed of the highlighted speaker side by side in an adjacent fashion.

3. The method of claim 1, wherein presenting the SLI view within the UI comprises presenting the video feed of the second participant as a smaller picture-in-picture within the video feed of the highlighted speaker.

4. The method of claim 1, further comprising:
   receiving a request from an authorized participant to record the communication session; and
   generating a recorded video of the communication session with the UI displayed within the recorded video comprising the presented SLI view.

5. The method of claim 4, wherein the UI of the recorded video comprises the presented SLI view in response to receiving an indication that the presented SLI view should be presented in the recorded video.

6. The method of claim 1, wherein the UIs of at least a subset of the client devices associated with participants other than the first participant and the second participant do not present the video feed of the second participant.

7. The method of claim 1, wherein determining that the second participant is to be designated as the sign language interpreter for the communication session comprises identifying a profile or settings parameter designating the second participant as the sign language interpreter.

8. The method of claim 1, wherein determining that the second participant is to be designated as the sign language interpreter for the communication session comprises receiving a selection within the UI from the first participant indicating that the second participant is to be designated as the sign language interpreter for the first participant.

9. The method of claim 1, wherein determining that the second participant is to be designated as the sign language interpreter for the communication session comprises determining that the second participant has connected to the communication session via a connecting link designated for a sign language interpreter.

10. The method of claim 1, further comprising:
    prior to receiving the request from the first participant, presenting, within the UI of the client device associated with the first participant, a UI element for selecting from a plurality of UI views, wherein the plurality of UI views to select from comprises at least the SLI view.

11. The method of claim 1, wherein determining that the second participant is to be designated as the sign language interpreter comprises identifying that the second participant is performing sign language interpretation in response to utterances of one or more active speakers.

12. The method of claim 1, wherein determining that the second participant is to be designated as the sign language interpreter is performed via one or more machine learning techniques.

13. The method of claim 1, wherein the highlighted speaker is a currently or recently active speaker within the communication session.

14. The method of claim 13, wherein the video feed of the highlighted speaker is replaced by a video feed of a second highlighted speaker while the video feed of the second participant remains present.

15. A communication system comprising one or more processors configured to perform operations of:
presenting a user interface (UI) for each of a plurality of client devices connected to a communication session, each UI comprising one or more video feeds associated with participants of the communication session;
determining that a first participant is to be designated as a deaf or hard-of-hearing (DHH) participant of the communication session;
receiving a request from the first participant to be presented with a sign language interpreter (SLI) view within the UI;
determining that a second participant is to be designated as a sign language interpreter for the communication session; and
presenting, within the UI of a client device associated with the first participant, an SLI view comprising at least a video feed of the second participant and a video feed of a highlighted speaker being interpreted by the second participant.

16. The communication system of claim 15, wherein presenting the SLI view within the UI comprises presenting the video feed of the second participant and the video feed of the highlighted speaker side by side in an adjacent fashion.

17. The communication system of claim 15, wherein presenting the SLI view within the UI comprises presenting the video feed of the second participant as a smaller picture-in-picture within the video feed of the highlighted speaker.

18. The communication system of claim 15, the one or more processors being configured to further perform the operations of:
receiving a request from an authorized participant to record the communication session; and
generating a recorded video of the communication session with the UI displayed within the recorded video comprising the presented SLI view.

19. A non-transitory computer-readable medium containing instructions for generating a note with session content from a communication session, comprising:
instructions for presenting a user interface (UI) for each of a plurality of client devices connected to the communication session, each UI comprising one or more video feeds associated with participants of the communication session;
instructions for determining that a first participant is to be designated as a deaf or hard-of-hearing (DHH) participant of the communication session;
instructions for receiving a request from the first participant to be presented with a sign language interpreter (SLI) view within the UI;
instructions for determining that a second participant is to be designated as a sign language interpreter for the communication session; and
instructions for presenting, within the UI of a client device associated with the first participant, an SLI view comprising at least a video feed of the second participant and a video feed of a highlighted speaker being interpreted by the second participant.

\* \* \* \* \*